US012152546B2

(12) United States Patent
Rotter et al.

(10) Patent No.: US 12,152,546 B2
(45) Date of Patent: *Nov. 26, 2024

(54) ANALOG CONTROLLER FOR ELECTRONIC THROTTLE BODY

(71) Applicant: Kohler Co., Kohler, WI (US)

(72) Inventors: Terrence M. Rotter, Sheboygan, WI (US); Jonathan T. Bykowski, Shorewood, WI (US); William D. Koenigs, Fond du Lac, WI (US)

(73) Assignee: Discovery Energy, LLC, Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,681

(22) Filed: Apr. 17, 2023

(65) Prior Publication Data

US 2023/0250769 A1 Aug. 10, 2023

Related U.S. Application Data

(63) Continuation of application No. 17/475,024, filed on Sep. 14, 2021, now Pat. No. 11,649,775.

(60) Provisional application No. 63/082,746, filed on Sep. 24, 2020.

(51) Int. Cl.
*F02D 41/00* (2006.01)
(52) U.S. Cl.
CPC ...... *F02D 41/0002* (2013.01); *F02D 2200/60* (2013.01)
(58) Field of Classification Search
CPC ...... B60K 11/085; G07C 5/0816; Y02T 10/88
See application file for complete search history.

(56) References Cited

U.S. PATENT DOCUMENTS

| 5,094,122 A | * | 3/1992 | Okita | B63H 21/22 |
| | | | | 74/109 |
| 5,431,141 A | * | 7/1995 | Kanazawa | B60K 26/04 |
| | | | | 123/399 |
| 5,447,133 A | | 9/1995 | Kamio et al. | |
| 6,015,319 A | * | 1/2000 | Tanaka | F02D 31/002 |
| | | | | 440/2 |
| 6,396,259 B1 | | 5/2002 | Washeleski et al. | |

(Continued)

FOREIGN PATENT DOCUMENTS

| JP | 2001260986 A | 9/2001 |
| JP | 2007297053 A | 11/2007 |

(Continued)

OTHER PUBLICATIONS

Electronics Tutorials, Position Sensors, 2019 version retrieved from Wayback Machine, https://www.electronics-tutorials.ws/io/io_2.html, as cited (Year: 2019).

*Primary Examiner* — Kurt Philip Liethen
(74) *Attorney, Agent, or Firm* — The Belles Group, P.C.

(57) ABSTRACT

A throttle assembly for an engine may include a remote throttle lever, a sensor, and a terminal. The remote throttle lever may be coupled physically to a user input device and operable to be moved under control of the user input device. The sensor is configured to detect a position of the remote throttle lever and generate an output signal indicative of the position of the remote throttle lever. The terminal configured to provide the output signal to a controller of the engine.

21 Claims, 11 Drawing Sheets

(56) References Cited

U.S. PATENT DOCUMENTS

| | | | |
|---|---|---|---|
| 6,485,340 B1* | 11/2002 | Kolb | B63H 21/213 440/86 |
| 6,675,733 B2* | 1/2004 | Hoshina | B63H 25/02 114/144 RE |
| 6,699,085 B2 | 3/2004 | Hattori | |
| 6,889,654 B2 | 5/2005 | Ito | |
| 7,524,222 B2* | 4/2009 | Ochiai | B63H 21/213 440/86 |
| 7,798,122 B2 | 9/2010 | Chandran et al. | |
| 7,938,702 B2* | 5/2011 | Suzuki | B63H 23/08 440/86 |
| 8,930,050 B2 | 1/2015 | Garon et al. | |
| 2006/0007316 A1 | 1/2006 | Yamanaka | |
| 2006/0107923 A1* | 5/2006 | Kusatsugu | F02D 9/02 123/399 |
| 2009/0221196 A1 | 9/2009 | Blair | |
| 2010/0038166 A1* | 2/2010 | Chandran | F02D 11/106 180/335 |
| 2010/0043589 A1* | 2/2010 | Chandran | B62K 23/06 74/504 |
| 2010/0182017 A1* | 7/2010 | Reddy | G01D 5/2412 324/662 |
| 2014/0326039 A1 | 11/2014 | Ikegami | |
| 2015/0247776 A1 | 9/2015 | Wagner | |
| 2016/0038984 A1 | 2/2016 | Hwang | |
| 2016/0298316 A1 | 10/2016 | Wamura | |
| 2017/0248092 A1 | 8/2017 | Radue | |
| 2018/0151003 A1* | 5/2018 | Grobler | G06F 16/90335 |
| 2018/0245704 A1 | 8/2018 | Narita | |
| 2018/0252191 A1* | 9/2018 | Pitcel | F04B 17/03 |
| 2022/0090547 A1 | 3/2022 | Bykowski et al. | |

FOREIGN PATENT DOCUMENTS

| | | |
|---|---|---|
| WO | 9214045 A1 | 8/1992 |
| WO | 2009008816 A1 | 1/2009 |
| WO | 2014082775 A1 | 6/2014 |
| WO | 2014135114 A1 | 9/2014 |

\* cited by examiner

ANALOG CONTROLLER FOR ELECTRONIC THROTTLE BODY

CROSS-REFERENCE TO RELATED APPLICATIONS

This application is a continuation of U.S. patent application Ser. No. 17/475,024, filed Sep. 14, 2021, which claims priority benefit to U.S. Provisional Utility Application Ser. No. 63/082,746, filed on Sep. 24, 2020, hereby incorporated by reference in their entireties.

FIELD

This disclosure relates in general to an engine including remote throttle control.

BACKGROUND

Small internal combustion engines are used in a variety of devices including, but not limited to, chainsaws, lawn mowers, weed trimmers, all-terrain vehicles, wood splitters, pressure washers, garden tillers, snow blowers, or other devices. The power of the engine may be controlled by a throttle that adjusts the flow of air and/or fuel that flows to the engine. In some engines, the throttle is controlled by a manual lever operator by the user. In other engines, the throttle is controlled by a lever that is connected to another mechanism. Depending on the type of throttle, some devices may not be compatible with some engines.

BRIEF DESCRIPTION OF THE DRAWINGS

Exemplary embodiments are described herein with reference to the following drawings.

DETAILED DESCRIPTION

A Bowden cable transmits mechanical force over a distance between two points. Bowden cables may be used with engines or apparatus that include engines. Examples may be vehicle engines, such as outboard marine, lawnmower, or golf cart, or handheld equipment such as a chainsaw, a weed trimmer, or an air blower, as well as other devices. These devices may include a handle or other user input portion where the user operates the device through applying a movement to the input portion connected to a Bowden cable. The Bowden cable may be used to transmit force between the input portion and the engine. The Bowden cable allows an inner portion (e.g., in error cable or wire) to move within an outer portion (e.g., an outer tube), which both protects the inner portion and allows the inner portion to transmit force without the need for joints or pulleys between the user input portion and the engine.

However, some engines may use electronic communication to circumvent the Bowden cable style of transferring force. Electronic communication could also allow an engine to receive a throttle setting and apply the throttle setting internally, without the use of a Bowden cable. The electronic communication may include radio frequency based wireless communication, line of site wireless communication, or communication through a wired conductor. However, a device equipped with a Bowden cable may be incompatible with such an engine utilizing electronic communication. The following embodiments includes examples in which a throttle control relay system receives user input at a Bowden cable style device and converts the user input to a control signal compatible with all types of engines.

Figure 1A:
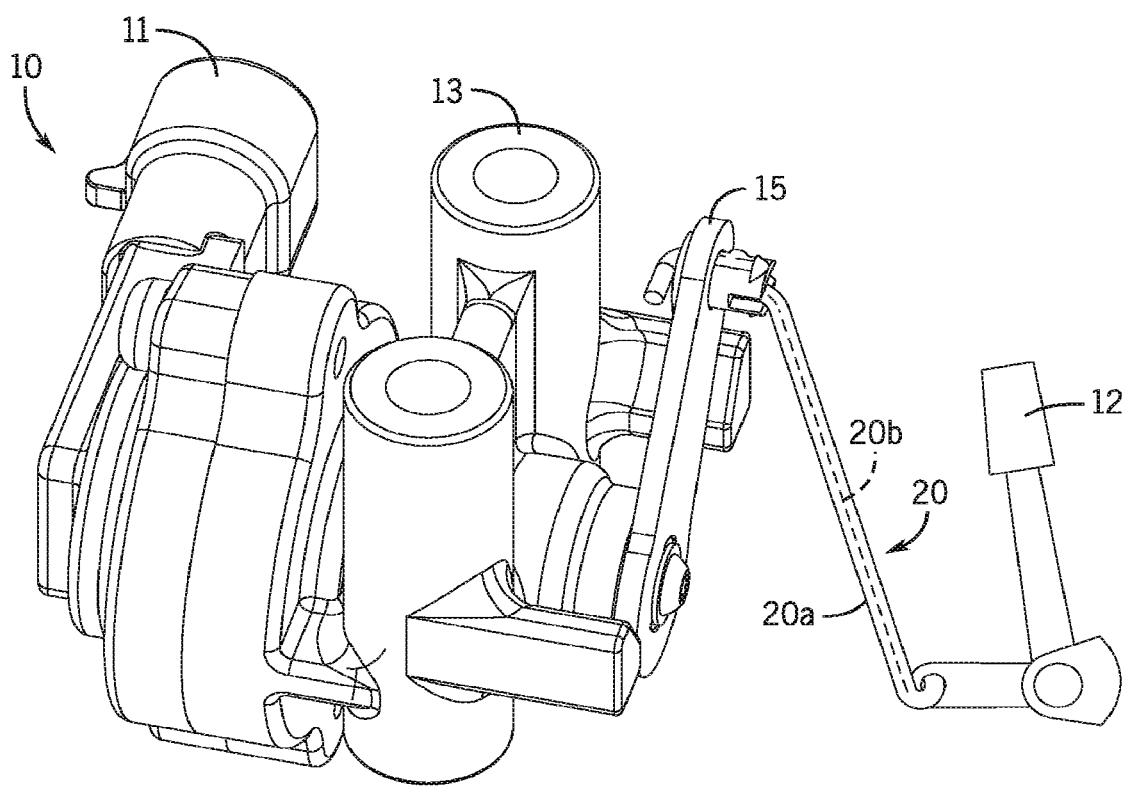
FIG. 1A illustrates a remote throttle control relay.
Figure 1B:
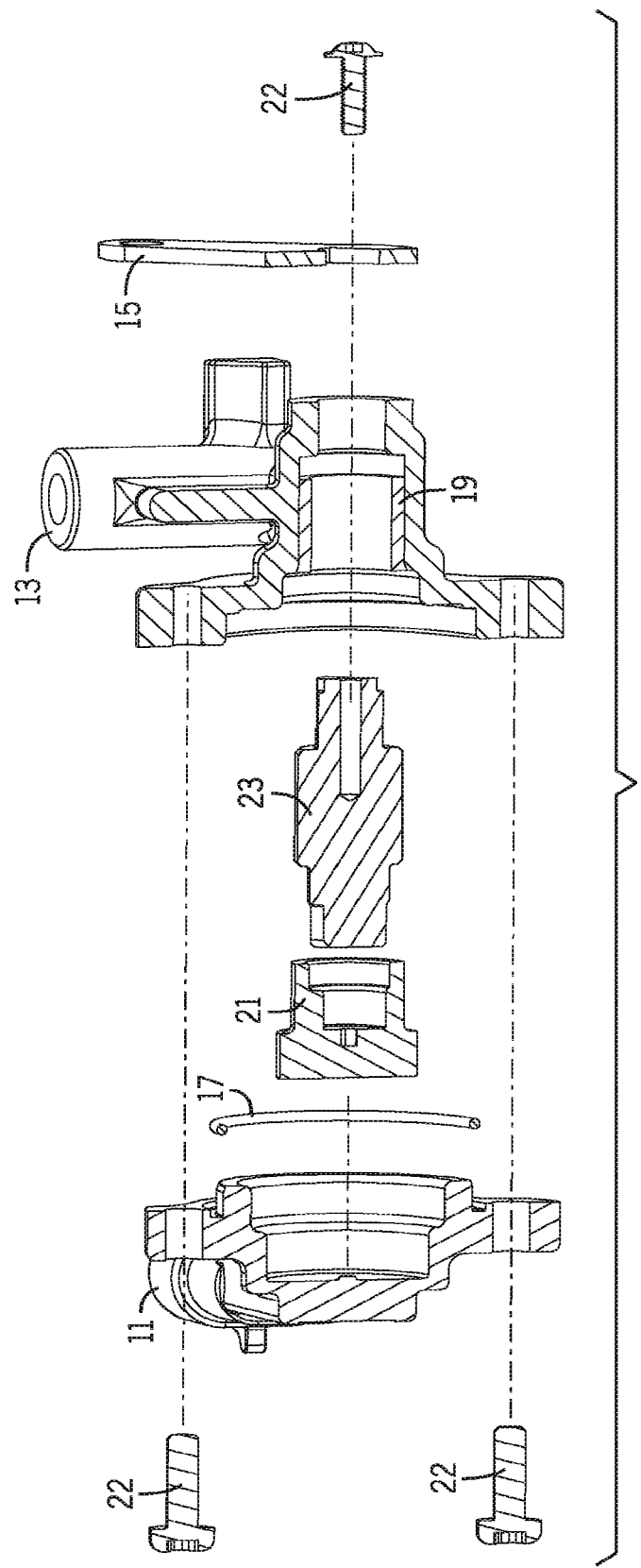
FIG. 1B illustrates an exploded view of the remote throttle control relay of FIG. 1.

FIG. 1A illustrates a remote throttle control relay 10. FIG. 1B illustrates an exploded view of the remote throttle control relay and enclosure of FIG. 1. The remote throttle control relay 10 may be an engine mounted actuator that the input of a Bowden wire style throttle cable and relays that position via a throttle position sensor to the electronic throttle body. This interim actuator allows certain types of engines to be attached to certain devices with a throttle cable without any additional modifications that may otherwise be necessary to connect the electronic throttle body to the throttle cable.

The remote throttle control relay 10 includes a harness side portion 11 of the enclosure, a lever side portion 13 of the enclosure, and lever 15. Inside the enclosure is a seal 17 (e.g., o-ring), a bushing 19, a sensor 21 and a shaft 23. One or more screws 22 or other fastener types may be coupled the components of the throttle control relay 10 together and/or to the engine. As shown, a pair of screws 22 extend through the harness side portion 11 and the lever side portion 13 to enclose the remote control throttle relay 10. Additional, different, or fewer components may be included.

The throttle lever 15 may be connected to an input lever 12 through an input 20 (e.g., Bowden cable or push pull rod). The input 20 may include an inner portion that moves within and with respect to an outer portion. The input 20 may include a metal wire 20b that slides within a plastic sheath 20a. The input 20 may include a stiff rod. The input 20 may include another type of drive train such as gear train or pulley system. The input lever 12 may be a push button or handle that the operator or user of the engine moves to adjust the throttle of the engine. The input line 20 causes the adjustment made by the operator to be reflected in the position of the throttle lever 15. Another screw 22 may connect the throttle lever 15 to the lever side portion 13.

The throttle lever position sensor 21 may be a magnetic sensor. The magnetic sensor may include an element in a measurement circuit that changes in resistance, inductance, or another electric characteristic based on position. The throttle lever position sensor 21 may be configured for a predetermined angle range. For example, the throttle lever position sensor 21 may use a 75 degree of rotation from the throttle plate of the engine fully closed to throttle plate fully open. The throttle lever 15 may operate in a linear distance of travel equal to 75 degrees for the throttle plate rotation. A longer throttle lever 15 may correspond to more linear travel for the same range of rotation.

The throttle lever position sensor 21 may be a potentiometer configured to cause a variable resistance between an input to the throttle lever position sensor 21 and the output of the throttle lever position sensor 21. The rotational position of the potentiometer causes the electrical resistance to change. Through a voltage divider or another variable resistance circuit, a resulting voltage or other electrical component may be measured, which translates to a physical position of the throttle lever position sensor 21.

The throttle lever position sensor 21 may be a linear variable differential transformer. The linear variable differential transformer may be a type of alternating current (AC) transformer including three coils wound on a hollow tube. One of the coils is a primary winding for the transfer, and the other two coils are secondary windings that are connect in series. As the throttle lever position sensor 21 move, the secondary coils are brought into varying degrees of overlap with the primary coil. The output of the linear variable differential transformer may then vary in an electrical component (e.g., voltage, power, inductance) as the throttle lever position sensor 21 is moved. A conversion device may be used to convert the rotational movement of the throttle lever position sensor 21 to the linear movement of the linear variable differential transformer. Through a measurement circuit, a resulting electrical component may be measured, which translates to a physical position of the throttle lever position sensor 21.

Output from the throttle lever position sensor 21 may be a variable voltage signal that indicates the position of the throttle lever 15, and indirectly the direction and degree of the user input. The throttle lever position sensor 21 may include an internal microprocessor, and the output voltage per angular increment of the throttle lever 15 are programmable to be able to make smooth transitions or stepwise changes to the output voltage. Attaining the desired speed/voltages may be programmed into the throttle lever position sensor 21. Table 1 is an example set of pairwise output voltage to engine speed association that may be used.

TABLE 1

| Volts | RPM |
| --- | --- |
| 0.00 | 1500 |
| 0.75 | 1600 |
| 1.00 | 1700 |
| 1.25 | 1800 |
| 1.50 | 2000 |
| 1.75 | 2200 |
| 2.00 | 2400 |
| 2.25 | 2600 |
| 2.50 | 2700 |
| 2.75 | 2900 |
| 3.00 | 3000 |
| 3.25 | 3150 |
| 3.50 | 3300 |
| 3.75 | 3550 |
| 4.00 | 3700 |
| 4.50 | 4000 |
| 5.00 | 4000 |

Figure 2A:
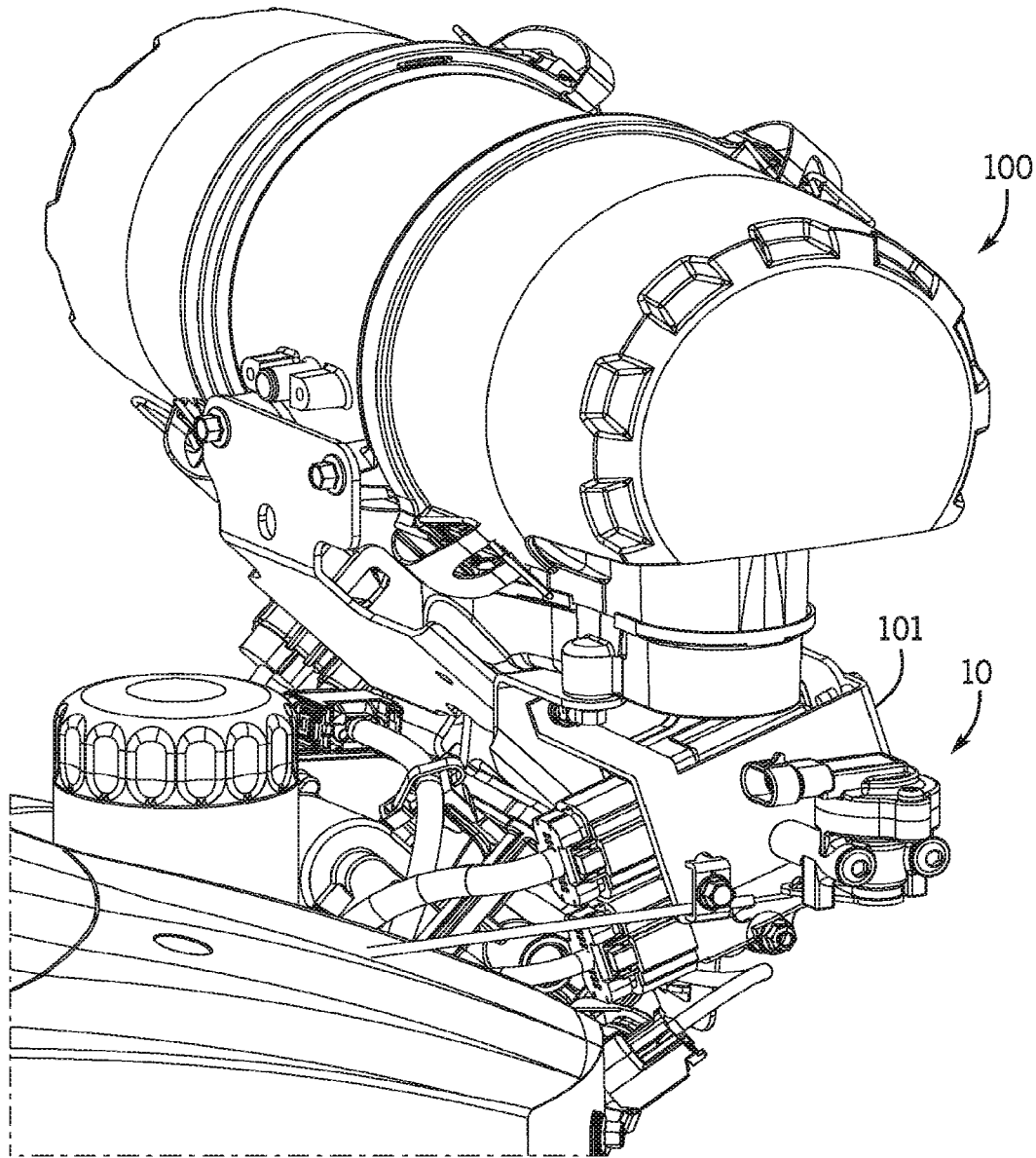
FIGS. 2A and 2B illustrate an example engine including remote throttle control relay.
Figure 2B:
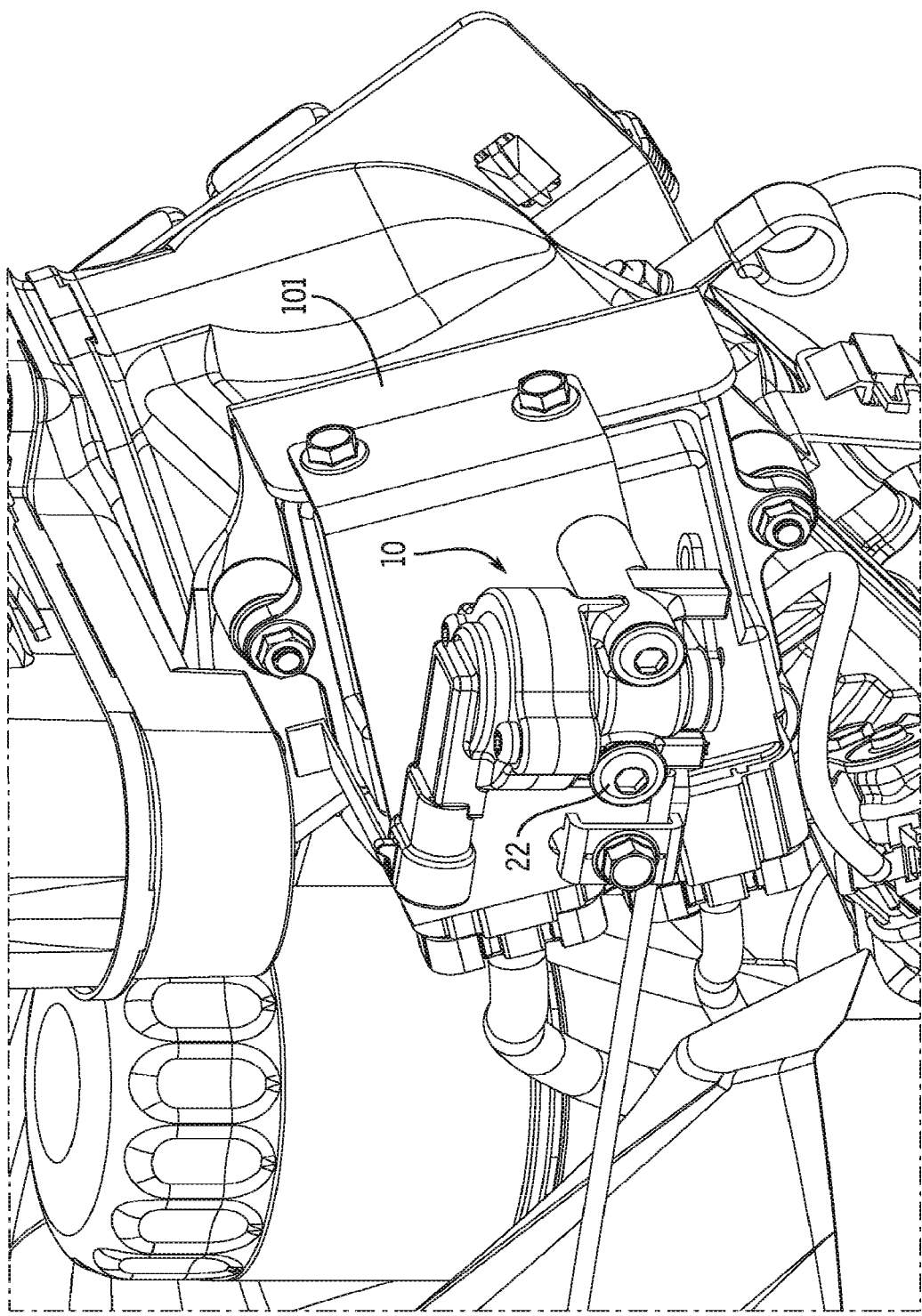

FIGS. 2A and 2B illustrate an example engine 100 including remote throttle control relay 10. The engine 100 may be a vertical shaft engine. The remote throttle control relay 10 may mount on top of the electronic control unit (ECU) 101 of the engine 100. For example, one or more screws may connect the remote control relay 10 to a housing of the ECU 101.

The output from the throttle lever position sensor 21 is provided to the ECU 101 for controlling the throttle (e.g., throttle plate). In one example, one or more wires connect the throttle lever position sensor 21 to the ECU 101. In another example, a controller connected to the throttle lever position sensor 21 generates a wireless signal to the ECU 101.

The throttle plate may be moved by a stepper motor or other actuator that operates in response to the voltage level in the variable voltage signal. The throttle adjusts the flow of air and/or fuel that flows to the engine 100. The throttle may control the flow of air flowing into the intake manifold or the flow of a mixture of air and fuel flowing into the intake manifold. The throttle may include a butterfly valve or a throttle plate that rotates to regulate the air. The valve or plate may be controlled by a mechanical coupling to the throttle assembly 30. The throttle may extend to the walls of the intake manifold. That is, the radius of a disk of the throttle may be slightly smaller than the radius of the intake manifold. Alternatively, the throttle may be spaced apart from the intake manifold such that some air can always flow around the throttle.

The engine 100 may be any type of engine in which the combustion of a fuel (e.g., gaseous fuel or liquid fuel) with an oxidizer (e.g., air) in a chamber applies a force to a drive component (e.g., piston, turbine, or another component) of the engine 100. The drive component rotates to turn a drive shaft.

The engine 100 may be four-stroke cycle engines, meaning four piston strokes make up a cycle. A compression cycle of the engine 100 includes an intake stroke, a compression stroke, a power stroke, and an exhaust stroke. During the intake stroke, the piston moves from the top of the cylinder to the bottom of the cylinder. A fuel and air mixture is forced by a pressure into the cylinder. Next, during the compression stroke, the piston moves back to the top of the cylinder, compression the fuel and air mixture into the cylinder head. The fuel is injected and/or atomized into the cylinder by a nozzle of the fuel injector. Next, during the power stroke, the compressed fuel and air mixture is ignited by a spark plug or heat source. The piston is pushed back down toward the bottom of the cylinder by the pressure. Finally, during the exhaust stroke, the piston returns to the top of the cylinder to expel the spent or combusted fuel and air mixture through an exhaust valve. In spark ignition engines, the air and fuel mixture is forced into the cylinder during intake and after the piston compresses the mixture, the spark ignites the mixture. The combustion from the spark causes gas to expand, which pushes the piston during the power stroke.

The liquid fuel may be gasoline, diesel, ethanol, or another example. The gaseous fuel may be liquefied petroleum gas (LPG), hydrogen gas, natural gas, biogas, or another gas. The LPG may be or include primarily butane, primarily propane, or a mixture of hydrocarbon gases. The hydrogen gas may include hydrogen mixed with air or oxygen. The hydrogen gas may be mixed with another fuel when delivered to the engine 100. Natural gas (e.g., compressed natural gas (CNG)) may be a hydrocarbon gas mixture. Biogas may be a gas produced by the breakdown of organic material.

The engine 100 may be used in a variety of devices including, but not limited to, chainsaws, lawn mowers, weed trimmers, all-terrain vehicles, wood splitters, pressure washers, garden tillers, snow blowers, a lawnmower, golf cart or other vehicles or devices.

The engine 100 may be liquid cooled or air cooled. In a liquid cooled engine, a radiator that houses cooling fluid that is pumped through the radiator. In an air cooled engine, one or more air paths through the engine that cool the engine. In some examples, the engine cylinder is cast with one or more fins that have a large surface area. As air blows across the cylinder and the fins, heat is removed from the engine.

Other systems in the engine 100 may include a fuel tank, a fuel line, a retractable starter, an air cleaning system, an exhaust system, a muffler, a control portion, a governor system, and a lubrication system. The retractable starter may include a recoil and a pull handle for starting the engine 100. The air cleaning system may include one or more filters for remove particles from the intake air for the engine 100. The muffler may receive exhaust air from the exhaust system including the byproducts of combustion in the engine 100. The muffler may reduce noise from the engine 100 and/or remove byproducts from the air. The governor system may regulate the throttle of the engine 100. The lubrication system may provide oil or another lubricant to the engine 100.

Figure 3A:
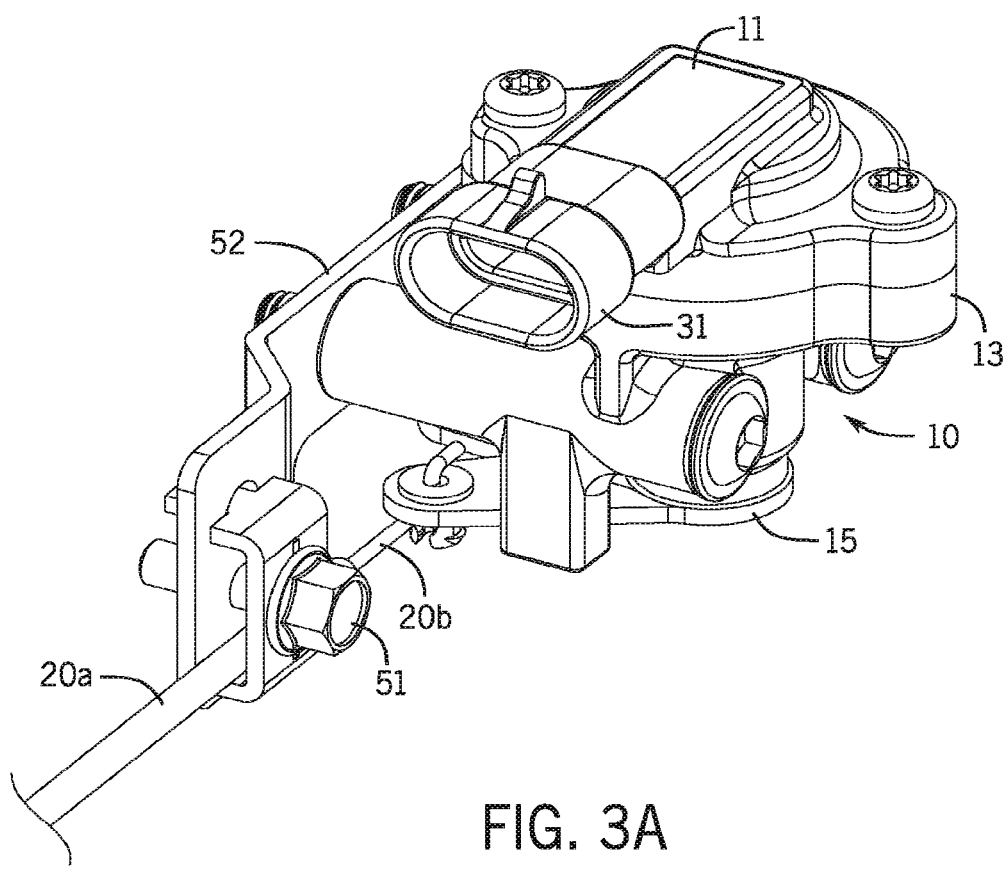
FIGS. 3A and 3B illustrate an example remote throttle control relay with a wiring harness connector.
Figure 3B:
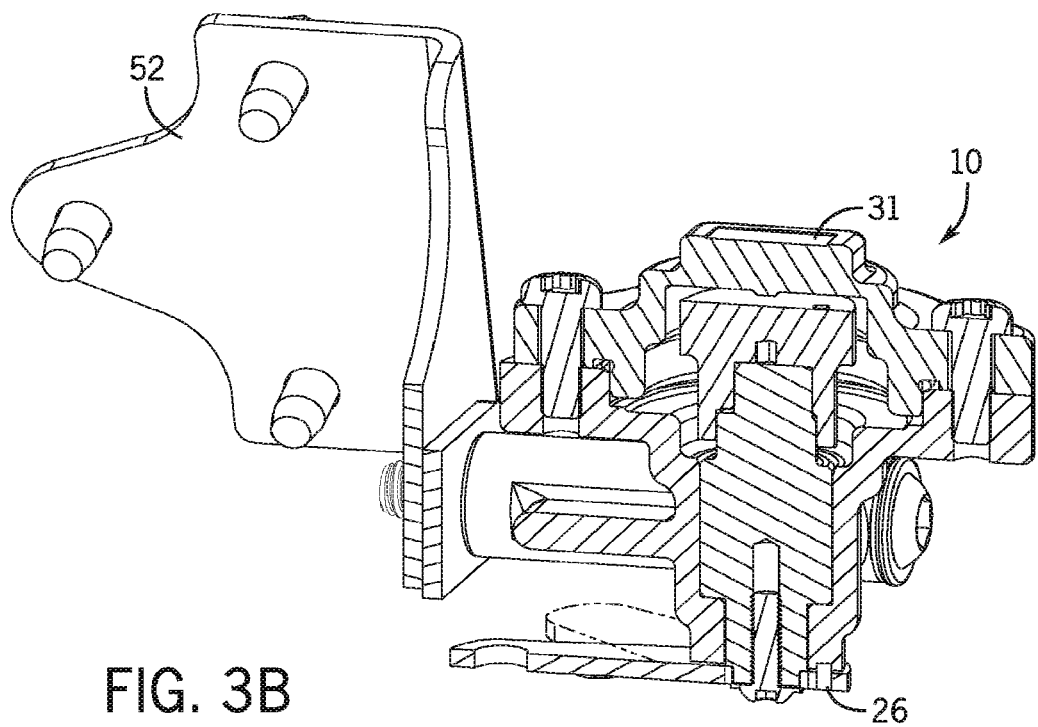

FIGS. 3A and 3B illustrate an example remote throttle control relay 10 with a wiring harness connector 31. FIG. 3A illustrates an example cable including a sheath 20a and an inner wire 20b. A bolt 51 may secure the cable to the mounting frame 52 coupled to the engine.

The throttle lever position sensor 21 may include a calibration input 26 configured to reset a reference position of the sensor. The calibration input 26 may be a button, slider, or clip that adjusts a relative position between the throttle lever 15 and the throttle lever position sensor 21. In one example, the user may move the throttle ever 15 to completely open or completely closed and press the calibration input 26 to reset the calibration of the throttle lever position sensor 21 and/or output values thereof in response to the calibration.

Figure 4:
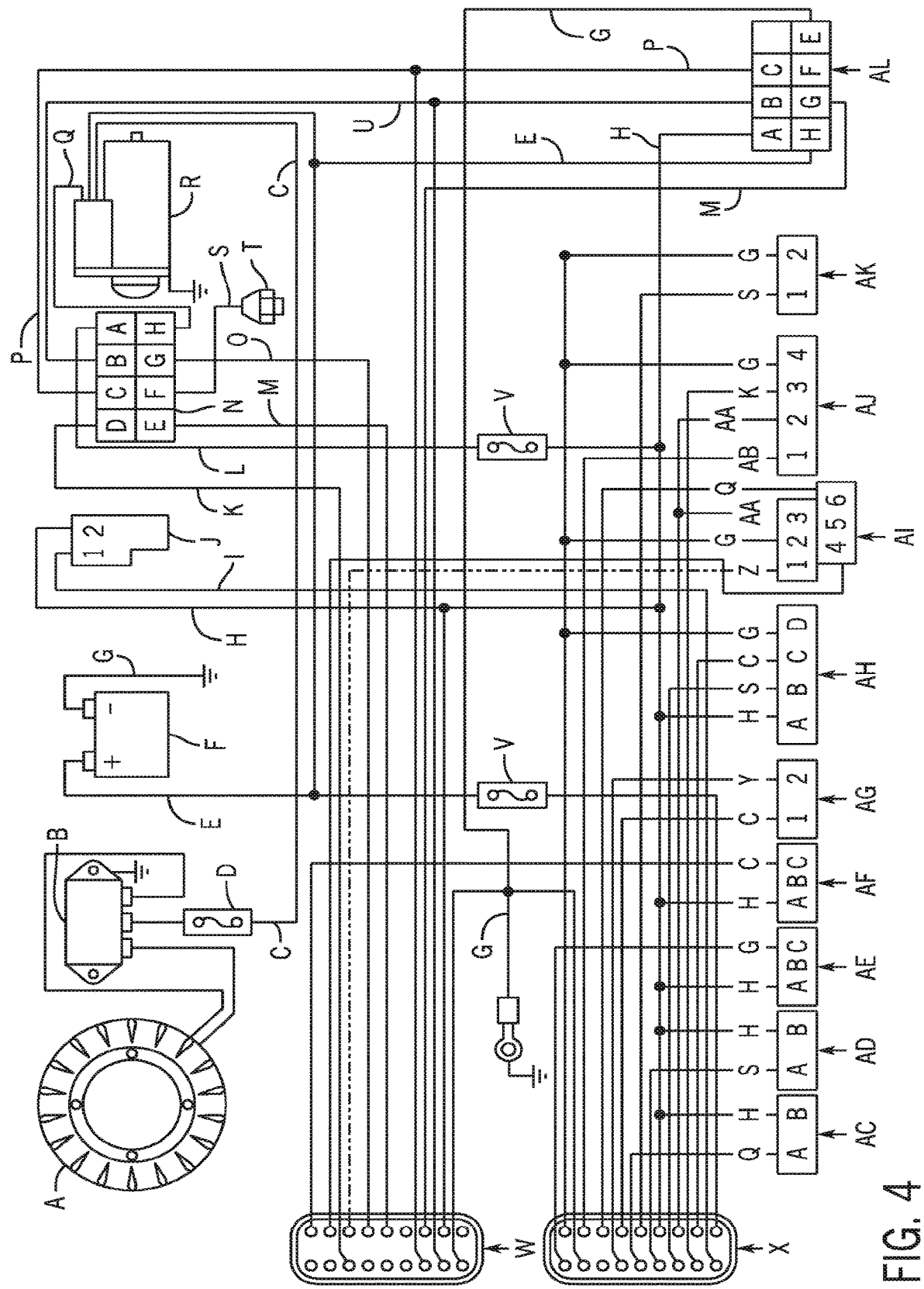
FIG. 4 illustrates an example wiring diagram for the remote throttle control relay.

FIG. 4 illustrates an example wiring diagram for the remote throttle control relay 10. In one example, the rotary position sensor 21 connects 3 wires; 5 volt input (constant voltage input) (e.g., connection AA), 0-5 volts output (variable voltage output) (e.g., connection O), and ground. The constant voltage input may be connected to the power of another engine device or engine function. For example, the constant voltage input may be connected to the power pin for another sensor (e.g., temperature and manifold pressure sensor or throttle position sensor). The ground may be connected to the chassis or a ground pin for another device (e.g., battery ground). The variable voltage output of the rotary position sensor 21 may be connected to an input pin for the throttle control (e.g., speed selection input) of the engine. The variable voltage output varies between a first value and a second value. The variable voltage output may be proportional to a change in the rotary movement, or linear distance, of the throttle lever 15. No additional circuit boards or modifications to the wiring of the ECU or the electronic throttle body are required.

Figure 5A:
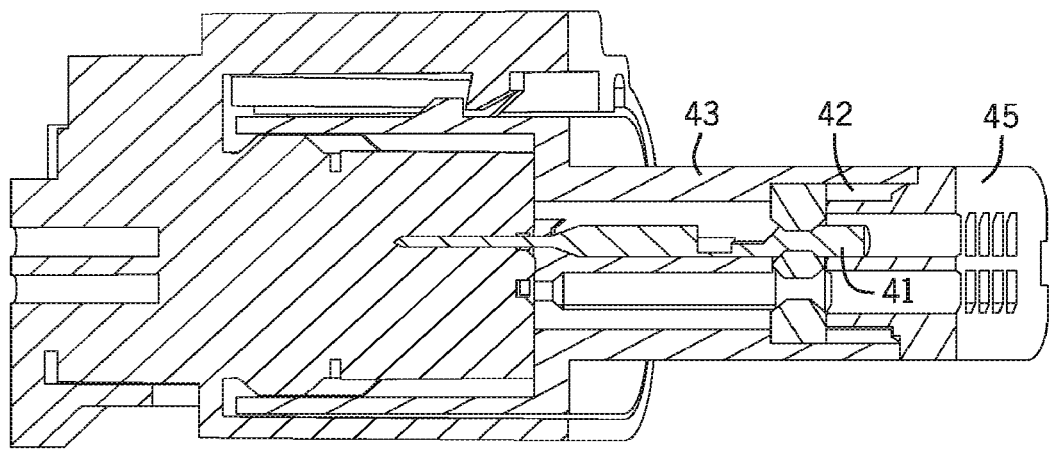
FIGS. 5A and 5B illustrates an example connector for the wiring harness
Figure 5B:
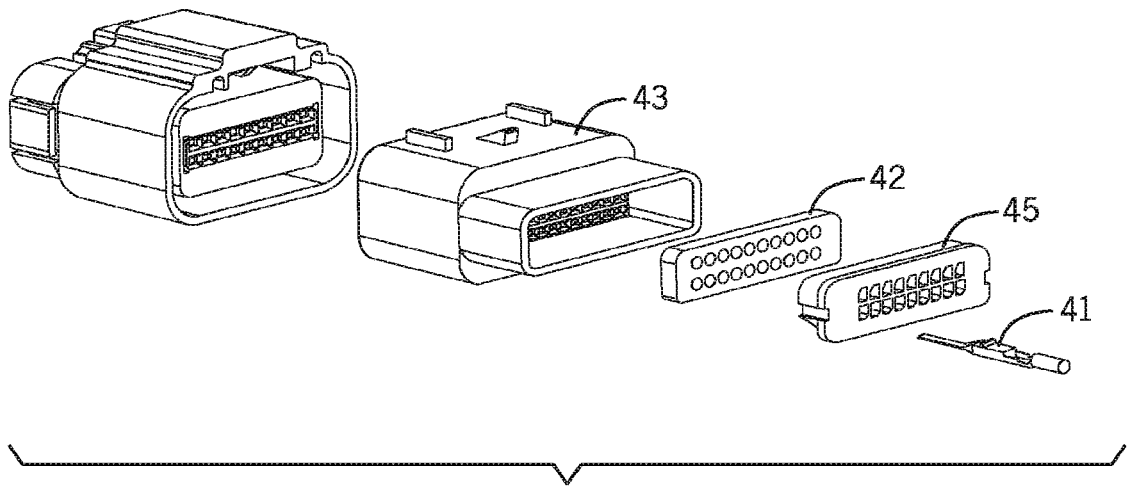

FIGS. 5A and 5B illustrates an example connector for the wiring harness 31. A male connector body 43 encloses a moisture sealing member 42, a wire pin connector 41 (e.g., terminal) and a snap in wire and seal retainer 45. The terminal 41 has a protrusion at the top to allow a snap feature in the body to prevent the terminal and wire from pulling out. Each wire with crimped on terminal is inserted through the retainer and seal into the connector body until the retaining finger snaps in place. The terminal 41 connects to the ECU 101 of the engine 100.

Figure 6:
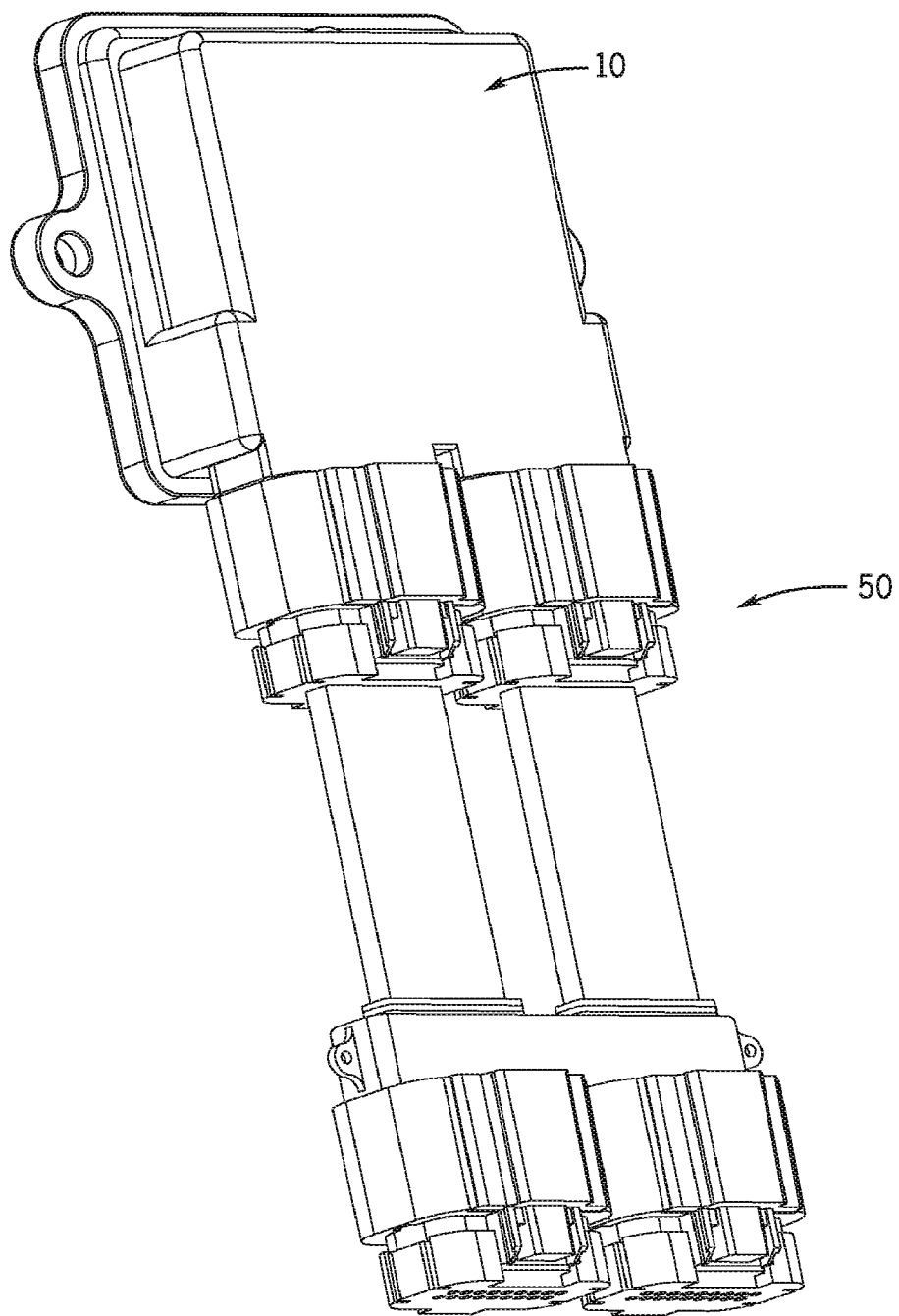
FIG. 6 illustrates a connection of the connector and wiring harness to an electronic control unit of the engine.

FIG. 6 illustrates a connection of the connector and wiring harness 50 to an electronic control unit 101 of the engine 100. In the specific example implementation of FIG. 4, the remote throttle control relay 10 may include connections to various components of the engine and output pins in pin arrays W and X. Components of the engine may include a stator A, a rectifier-regulator B, a fuse D connected by connection C to the starter motor R. A battery F connected by connection E to the starter motor R. A fuel pump module J connected by connection H and I to the pin arrays X and Y. A ground G is connected to various components.

An eight terminal connector N, also connected to pin array W, may include a connection K, a connection L, and a connection O. As illustrated the connection O corresponds to the variable voltage output the remote throttle control relay 10. Additional connection P may couple to a diagnostic connector AL.

A starter motor R may be connected to the rectifier-regulator B through the fuse D and to connector N and to the connector N through connection Q. A connection U connects the starter motor R to the diagnostic connector AL. An oil pressure switch T is connected to connector N through connection S. A fuse V connects the battery B to the pin array X. Another fuse V may connect the connector N to the pin array X.

Additional components in the engine and corresponding to wiring pins in the wiring harness may include a first fuel injector AC, a second fuel injector AD, a first ignition coil AE, a second ignition coil AF, a crankshaft position sensor AG, an oxygen sensor AH, an electronic throttle control (ETC) AI, a temperature manifold absolute pressure (TMAP) sensor AJ, and an engine temperature sensor AK. In one example, the TMAP sensor and/or the ETC AI includes the constant 5 volt signal, as indicated by connection AA.

Figure 7:
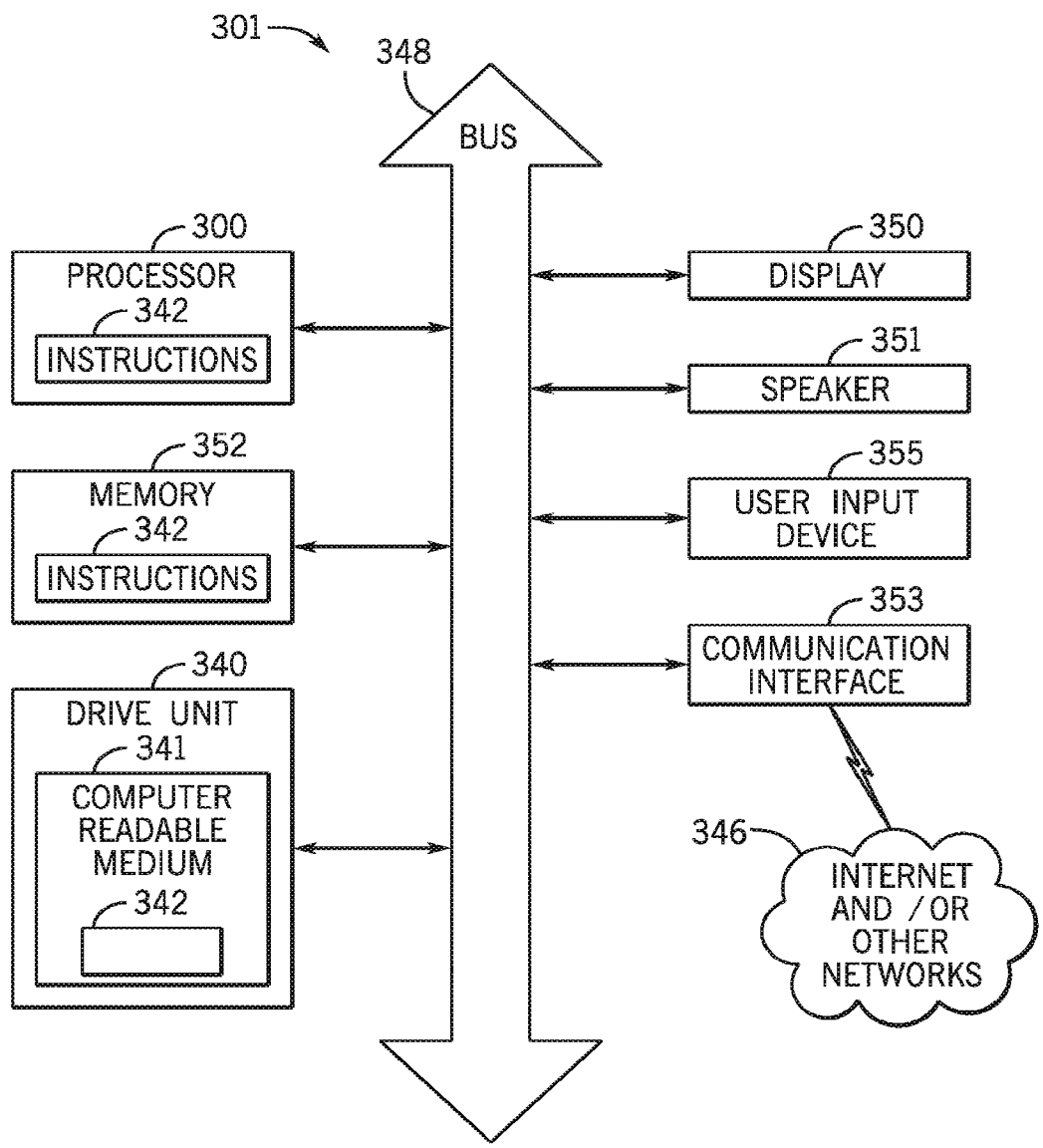
FIG. 7 illustrates an example control system.
Figure 8:
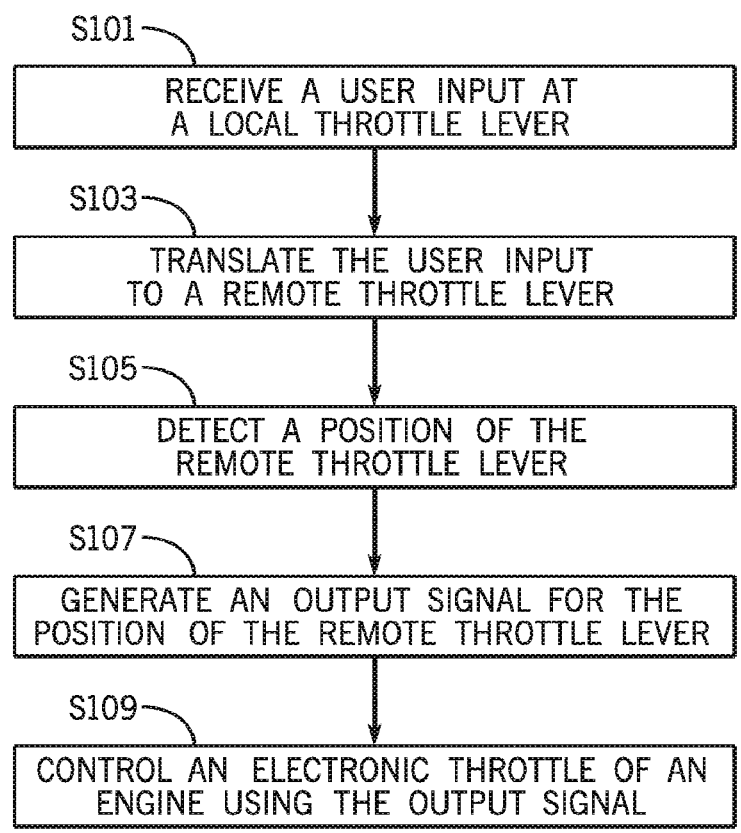
FIG. 8 illustrates an example flowchart for the remote throttle control relay.

FIG. 7 illustrates an example embodiment for a control system 301 for the remote throttle control relay 10. The control system 301 may include a processor 300, a memory 352, and a communication interface 353 for interfacing with devices or to the internet and/or other networks 346. In addition to the communication interface 353, a sensor interface may be configured to receive data from the sensor 21. Additional sensor data may receive from the first fuel injector AC, the second fuel injector AD, the first ignition coil AE, the second ignition coil AF, the crankshaft position sensor AG, the oxygen sensor AH, the ETC AI, the TMAP sensor AJ, and the engine temperature sensor AK. Additional, different, or fewer components may be included.

The components of the control system 301 may communicate using bus 348. The control system 301 may be connected to a workstation or another external device (e.g., control panel) and/or a database for receiving user inputs, system characteristics, and any of the values described herein. Optionally, the control system 301 may include an input device 355 and/or a sensing circuit in communication with any of the sensors. The sensing circuit receives sensor measurements from as described above. The input device 355 may include a touchscreen coupled to or integrated with the control system 301, a keyboard, a microphone for voice inputs, a camera for gesture inputs, and/or a holographic interface coupled to or integrated with the control system 301.

Optionally, the control system 301 may include a drive unit 340 for receiving and reading non-transitory computer media 341 having instructions 342. Additional, different, or fewer components may be included. The processor 300 is configured to perform instructions 342 stored in memory 352 for executing the algorithms described herein. A display 350 may be supported by the control system 301. The display 350 may be combined with the user input device 355.

Figure 9:
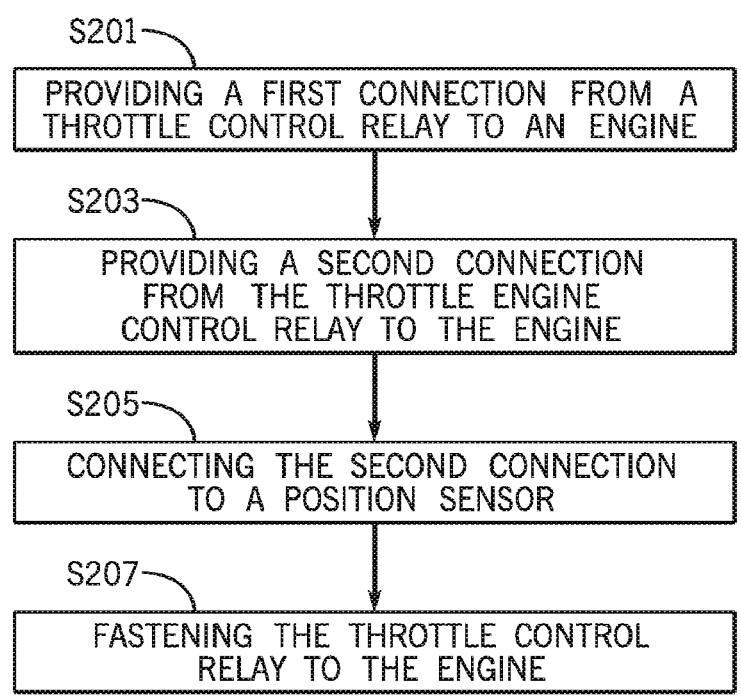
FIG. 9 illustrates an example flowchart for a process of manufacturing the throttle assembly.

FIG. 9 illustrates an example flowchart for a process of operating the throttle assembly. Additional, different, or fewer acts may be included.

At act S101, a user input is received at a local throttle lever. The local throttle lever may be a handheld lever that is squeezed. The local throttle lever may be a twisted grip that is rotates around a handlebar or another steering mechanism. The local throttle lever may be a monkey grip. The local throttle lever may be electronic including one or more push button or alphanumeric inputs.

At act S103, the user input is translated to a remote throttle lever using a mechanical translation device such as a cable or a rod. The mechanical translation device may transmit the force at the user input to another location (e.g., local to the engine).

At act S105, a position of the remote throttle lever is detected by the sensor 21 through the processor 300 and/or control system 301. The sensor 21 may be a magnetic sensor in a measurement circuit. The magnetic sensor, in response to the position of the remote throttle lever, may change resistance, inductance, or another electric parameter. As a predetermined voltage or current is provided across or through the magnetic sensor, the processor 300 and/or control system 301 measures the modified electric parameter. The magnetic sensor may be a coil, and the processor 300 and/or control system 301 may detect a change in magnetic flux density through the coil. The magnetic sensor may be a reed switch include two or more magnetic components (e.g., in a glass tube) that are brought into proximity by movement of the remote throttle lever. At a predetermined proximity, the magnetic components come into contact, which is detected through the measurement circuitry by processor 300 and/or control system 301.

In one example, the sensor 21 is a potentiometer. The processor 300 and/or control system 301 measure the resistance of the potentiometer through the measurement circuit. The resistance indicates of the position of the remote control lever. The sensor may include an inductive sensor including at least one coil or transformer. The processor 300 and/or control system 301 measure the inductance of the inductive sensor through the measurement circuit. The inductance indicates of the position of the remote control lever.

The sensor 21 may be an optical or line-of-sight sensor. The sensor 21 may emit a beam of light or a LASER that is reflected to determine the position of the remote control lever. In one example, the processor 300 and/or control system 301 measure the time of flight of the reflected light to calculate the position of the remote control lever. In one example, the remote control lever includes indicia that are detected by the optical sensor and analyzed by the processor 300 and/or control system 301. For example, the optical sensor may be aligned at a particular position (e.g., window) and the remote control lever is moved through the particular position. The indicia, lines of different thicknesses, circles of different radius, or other examples, are included in a pattern on the remote control lever. Depending on the position of the remote control lever, the optical sensor detects different indicia, and the processor 300 and/or control system 301 references the indicia to determine position.

At act S107, an output signal indicative of the position of the remote throttle lever is generated. At act S109, the throttle of the engine is controlled according to the output signal. For example, a throttle plate may be opened or closed a predetermined amount or to a predetermined position based on the output signal. The processor 300 and/or control system 301 may generate a command to move the throttle plate. The command may include a stepper motor position, a stepper motor increment, or an angle value.

FIG. 9 illustrates an example flowchart for a process of manufacturing the throttle assembly. Additional, different, or fewer acts may be included.

At act S201, a connecting a first electrical connection from the throttle control relay 10 to an engine. The first electrical connection may include a wire or a pin connector of a wiring harness. The first electrical connection may be a constant voltage source of the engine. The constant voltage source may be 5 volts, 12 volts, or another value. The constant voltage source may be provided by a battery or rectifier. The constant voltage source may be associated with a starter or ignition for the engine. The constant voltage source may be provided to the first electrical connection by a jumper or bridge to a predetermined pin or wire of the electronic throttle controller or a sensor such as the TMAP sensor.

At act S203, a connecting a second electrical connection from the throttle control relay 10 to the engine. The second electrical connection may include a wire or a pin connector of a wiring harness. The second electrical connection may be a variable voltage input provided to the engine, for example, provided to the electronic throttle controller.

At act S205, connecting the second electrical connector to a position sensor for a user input. Any of the example position sensors described herein may be used.

At act S207, fastening the throttle control relay 10 to the engine. The throttle control relay 10 may be fastened using one or more screws, bolts, or other fasteners.

The phrases "coupled with" or "coupled to" include directly connected to or indirectly connected through one or more intermediate components. Additional, different, or fewer components may be provided. Additional, different, or fewer components may be included.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A throttle control device for an engine, the throttle control device comprising:
    a throttle lever configured to receive user input, wherein the throttle lever is movable within a range of positions including a first position and a second position in response to the user input;
    a sensor configured to detect the position of the throttle lever in the range of positions and generate an output signal indicative of the position of the throttle lever;
    a terminal configured to provide the output signal to a controller of the engine; and
    a calibration input configured to reset a reference position of the sensor relative to the throttle lever to the second position when the calibration input is actuated by a user after moving the throttle lever to the second position.

2. The throttle control device of claim 1, further comprising a cable that couples the throttle lever to a user input device.

3. The throttle control device of claim 1, wherein a voltage of the output signal is proportional to the position of the throttle lever.

4. The throttle control device of claim 1, wherein the terminal is located within a connector.

5. The throttle control device of claim 1, wherein the sensor is a magnetic sensor.

6. The throttle control device of claim 1, wherein the sensor comprises a potentiometer having a variable resistance depending on the position of the throttle lever.

7. The throttle control device of claim 1, wherein the sensor includes a linear variable differential transformer.

8. The throttle control device of claim 1, wherein the calibration input is one of a button, slider, or clip.

9. An engine comprising:
    an electronic control unit;
    a throttle control device comprising:
        a throttle lever configured to receive user input, wherein the throttle lever is movable within a range of positions including a first position and a second position in response to the user input;
        a sensor configured to detect the position of the throttle lever in the range of positions and generate an output signal indicative of the position of the throttle lever;
        a terminal configured to provide the output signal to the electronic control unit of the engine; and
        a calibration input configured to reset a reference position of the sensor relative to the throttle lever to the second position as a result of a user moving the throttle lever from the first position to the second position and actuating the calibration input; and
    an actuator configured to operate a throttle of the engine in response to a throttle position signal from the electronic control unit.

10. The engine of claim 9, further comprising a cable that couples the throttle lever to a user input device.

11. The engine of claim 9, wherein a voltage of the output signal is proportional to the position of the throttle lever.

12. The engine of claim 9, wherein the terminal is located within a connector.

13. The engine of claim 9, wherein the sensor is a magnetic sensor.

14. The engine of claim 9, wherein the sensor comprises a potentiometer having a variable resistance depending on the position of the throttle lever.

15. The engine of claim 9, wherein the sensor includes a linear variable differential transformer.

16. A method for operating a throttle of an engine, the method comprising:
    receiving a user input at a throttle lever of a throttle control device;
    detecting a position of the throttle lever via a sensor of the throttle control device;
    generating an output signal indicative of the position of the throttle lever;
    calibrating the throttle lever via a calibration input of the throttle control device, the calibration input configured to reset a reference position of the sensor relative to the throttle lever in response to the throttle lever being moved to a new reference position and the calibration input being actuated; and
    controlling the throttle, via an actuator, according to the output signal.

17. The method of claim 16, wherein controlling the throttle according the output signal comprises generating a command to move a throttle plate.

18. The method of claim 16, wherein detecting the position of the throttle lever comprises measuring a resistance, the resistance indicative of the position of the throttle lever.

19. The method of claim 16, wherein detecting the position of the throttle lever comprises measuring an inductance, the inductance indicative of the position of the throttle lever.

20. The method of claim 16, wherein detecting the position of the throttle lever comprises measuring the position of the throttle lever with a position sensor.

21. The throttle control device of claim 1, further comprising a housing, wherein the calibration input is movably supported by the housing.

* * * * *